No. 896,217. PATENTED AUG. 18, 1908.
F. R. KUNKEL.
WINDING FOR SINGLE PHASE INDUCTION MOTORS.
APPLICATION FILED DEC. 3, 1906.

WITNESSES:
C. L. Belcher
Otto S. Schairer

INVENTOR
Fred R. Kunkel
BY
Wiley G. Carr
ATTORNEY

UNITED STATES PATENT OFFICE.

FRED R. KUNKEL, OF EDGEWOOD PARK, PENNSYLVANIA, ASSIGNOR TO WESTINGHOUSE ELECTRIC & MANUFACTURING COMPANY, A CORPORATION OF PENNSYLVANIA.

WINDING FOR SINGLE-PHASE INDUCTION-MOTORS.

No. 896,217.      Specification of Letters Patent.      Patented Aug. 18, 1908.

Application filed December 3, 1906. Serial No. 346,080.

*To all whom it may concern:*

Be it known that I, FRED R. KUNKEL, a citizen of the United States, and a resident of Edgewood Park, in the county of Allegheny and State of Pennsylvania, have invented a new and useful Improvement in Windings for Single-Phase Induction-Motors, of which the following is a specification.

My invention relates to windings for dynamo-electric machines, and particularly to the primary windings of single-phase induction motors.

The object of my invention is to provide a winding that shall permit of the application of either of two voltages to a motor having an auxiliary winding to aid in starting.

For the purpose of affording a starting torque for single-phase induction motors, auxiliary windings having different time constants from the main windings are frequently connected in parallel relation to the main windings until the motors attain predetermined speeds. Such motors may be adapted for operation by either of two voltages by dividing the main winding into two sections that may be arranged in series relation for the higher voltage and in parallel relation for the lower voltage and, when so adapted, I propose to connect the auxiliary or starting winding in parallel relation to one section only of the main winding, in order that the same voltage may always be applied thereto. I propose, further, to so arrange the sections of the main winding that the fluxes produced thereby may be so interlinked as to make the resultant field flux approximately the same for all portions of the magnetic circuit.

Figure 1:
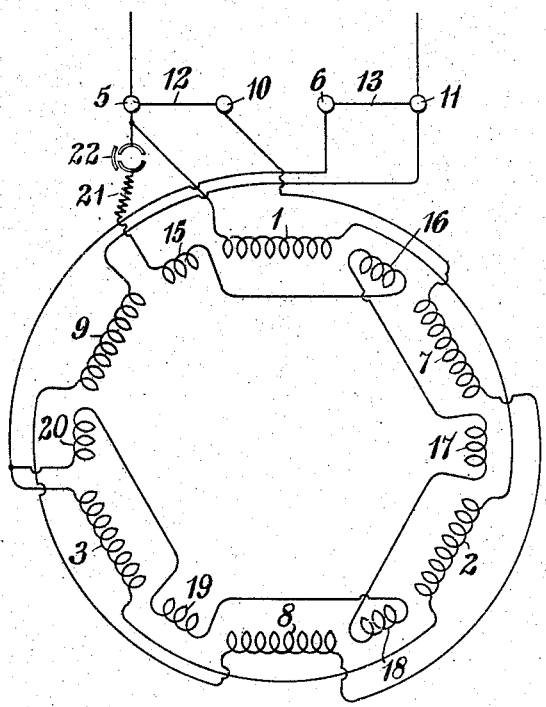
Figure 2:
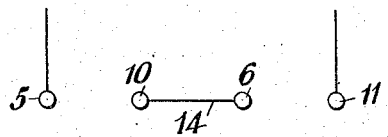

Figure 1 of the accompanying drawing is a diagrammatic view of the winding of a motor that embodies my invention, and Fig. 2 is a similar view of a modification of a portion of what is shown in Fig. 1.

Referring to Fig. 1, the main winding of an induction motor is divided into two sections the first of which comprises a plurality of divisions or groups of coils 1, 2 and 3, that are connected in series relation between the terminal pieces or binding posts 5 and 6, and the second of which comprises a plurality of divisions or groups of coils 7, 8 and 9 that are connected in series relation between binding posts 10 and 11. The division or groups of coils of the respective sections alternate in position in order that the fluxes produced thereby may be interlinked. For operation of the motor on a low voltage, the sections of the winding may be connected in parallel relation by means of connections 12 and 13, respectively, between the binding posts 5 and 10, and 6 and 11, and for operation upon a high voltage the sections of the winding may be connected in series relation by means of a line 14 which connects binding posts 6 and 10, as indicated in Fig. 2. The motor is also provided with an auxiliary or starting winding comprising a plurality of divisions or groups of coils 15, 16, 17, 18, 19 and 20 that alternate in position with the groups of coils of the main winding, and are preferably so placed that the electrical angle between their pole centers and the pole centers of the coils of the main winding is approximately ninety degrees, though the arrangement may be such as to provide a smaller electrical angle if found necessary or advisable. A resistance 21 may be connected in series with the auxiliary winding, in order to cause it to have a different time constant from that of the main winding, though other suitable means may be employed for the purpose.

The auxiliary winding is normally connected in parallel relation to the section of the main winding comprising divisions 1, 2 and 3 by means of a switch 22 that is preferably operated by centrifugal force when the motor attains a predetermined speed. As the auxiliary winding is connected in parallel relation to one section only of the main winding, substantially the same voltage will be applied thereto regardless of whether the motor is connected to a high or to a low voltage circuit, providing, of course, that the high voltage is double the low voltage. When two sections of the main winding are arranged in series relation, the current which traverses the section that is shunted by the auxiliary winding will be less in amount than that which traverses the other section, and in order to overcome any non-uniformity in the flux per pole that might result from this cause the divisions or groups of coils of the respective sections of the main winding are disposed alternately so that the fluxes produced thereby may be interlinked in such a manner as to produce a resultant flux which coöperates with that produced by the auxiliary winding.

I claim as my invention:

1. In an electric motor, the combination with a main winding having two sections adapted to be connected in either series or parallel relation, of an auxiliary winding adapted to be connected in parallel relation to only one section of the main winding when the sections are connected in series with each other.

2. In an electric motor, the combination with a main winding having two sections, each of which comprises a plurality of divisions, the divisions of the respective sections alternating in position, and means for connecting the sections in either series or parallel relation, of an auxiliary winding and means for connecting the same in parallel relation with only one section of the main winding when the sections are connected in series with each other.

3. In an electric motor, the combination with a main winding having two sections adapted to be connected in either series or parallel relation, the sections being so disposed as to cause interlinking of the fluxes produced thereby, of an auxiliary winding adapted to be connected in parallel relation with only one section of the main winding when the sections are connected in series with each other.

4. In an electric motor, the combination with a main winding comprising two sections adapted to be connected in either series or parallel relation and severally composed of a plurality of groups of coils so disposed that the groups of one section alternate with those of the other, of an auxiliary winding comprising groups of coils which are symmetrically disposed with reference to the groups of the main winding sections and are connected in series with each other and in parallel with one of the sections of the main winding.

5. In an electric motor, the combination with a main winding comprising two sections adapted to be connected in either series or parallel relation and severally composed of a plurality of groups of coils so disposed that the groups of one section alternate with those of the other, of an auxiliary winding comprising groups of coils which are symmetrically disposed with reference to the groups of the main winding sections and are connected in series with each other and in parallel with only one of the sections of the main winding when the sections are connected in series with each other.

In testimony whereof, I have hereunto subscribed my name this 28th day of November, 1906.

FRED R. KUNKEL.

Witnesses:
R. P. JACKSON,
BIRNEY HINES.